US010509607B2

(12) United States Patent
Liebelt et al.

(10) Patent No.: US 10,509,607 B2
(45) Date of Patent: Dec. 17, 2019

(54) DYNAMIC REVISION OF PAGE DESCRIPTION LANGUAGE PRINT JOBS THAT USE PREPRINTED FORMS

(71) Applicants: Linda Sue Liebelt, Boulder, CO (US); Michael Glen Lotz, Longmont, CO (US); Jeffrey Alan Sikkink, Longmont, CO (US); Marquis G. Waller, Beverly, OH (US)

(72) Inventors: Linda Sue Liebelt, Boulder, CO (US); Michael Glen Lotz, Longmont, CO (US); Jeffrey Alan Sikkink, Longmont, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 15/795,778

(22) Filed: Oct. 27, 2017

(65) Prior Publication Data
US 2019/0129660 A1    May 2, 2019

(51) Int. Cl.
*G06F 3/12* (2006.01)
*G06F 3/06* (2006.01)

(52) U.S. Cl.
CPC .......... *G06F 3/1212* (2013.01); *G06F 3/1243* (2013.01); *G06F 3/1247* (2013.01); *G06F 3/1248* (2013.01); *G06F 3/1288* (2013.01)

(58) Field of Classification Search
CPC .... G06F 3/1208; G06F 3/1212; G06F 3/1247; G06F 3/1248; G06F 3/1243; G06F 3/1242; G06F 3/125; G06F 3/1255; G06F 3/1254; G06F 3/1257; G06F 3/1258; G06F 3/1252; G06F 3/1288; G06F 17/243; H04N 1/00777; H04N 1/00782
(Continued)

(56) References Cited

U.S. PATENT DOCUMENTS 7,821,666 B2   10/2010   Double
7,948,647 B2   5/2011    Matsunaga et al.
(Continued)

FOREIGN PATENT DOCUMENTS

CN        107066213 A        8/2017

OTHER PUBLICATIONS

Francois Guimbretiere; Paper Augmented Digital Documents; University of Maryland 2000.

*Primary Examiner* — Chad Dickerson
(74) *Attorney, Agent, or Firm* — Duft & Bornsen, PC

(57) ABSTRACT

Systems and methods are provided for replacing preprinted forms with blank print media. One embodiment is a system that includes a memory that stores entries which include Page Description Language (PDL) instructions for marking blank print media to match different types of preprinted forms, and an interface that receives a print job comprising PDL print data. The system also includes a controller that determines that the print job includes a media callout referring to one of the types of preprinted forms, consults an entry that corresponds with the type of preprinted form, integrates PDL instructions from the entry into PDL print data for an existing page of the print job to match an appearance of the type of preprinted form at the existing page, selects a printer, and transmits the print job to the printer for printing after the PDL instructions have been integrated.

17 Claims, 14 Drawing Sheets

(58) Field of Classification Search
USPC ...... 358/1.11–118, 1.9, 2.1, 3.23, 3.24, 3.28, 358/3.31, 540, 403, 450, 1.11–1.18; 715/221–225
See application file for complete search history.

(56) References Cited

U.S. PATENT DOCUMENTS

| | | |
|---|---|---|
| 8,325,368 B2 | 12/2012 | Watanabe |
| 8,860,994 B2 | 10/2014 | Stokes et al. |
| 8,896,896 B2 | 11/2014 | Lewis et al. |
| 9,081,532 B2 | 7/2015 | Danner |
| 2003/0202213 A1* | 10/2003 | Saito .................. H04N 1/32144 358/1.18 |
| 2003/0210428 A1* | 11/2003 | Bevlin ................. G06K 9/2063 358/1.18 |
| 2004/0120011 A1* | 6/2004 | Double ................. G06F 17/243 358/1.18 |
| 2012/0008168 A1* | 1/2012 | Danner ................ G06F 3/1206 358/1.15 |
| 2012/0013922 A1* | 1/2012 | Lotz .................... G06F 3/1208 358/1.9 |
| 2013/0063738 A1* | 3/2013 | Lewis .................. G06F 3/1208 358/1.9 |
| 2014/0043645 A1* | 2/2014 | Stokes ................. G06F 3/1208 358/1.15 |

* cited by examiner

*FIG. 6*

EXAMPLE ENTRY

ENTRY: "FORM_65"
NAME: "CLIENT_A_STMT"
ACTION: CHANGE MEDIA CALLOUT TO BLANK_Y_LTR
FRONT:
    -ADD BOILERPLATE TERMS TEXT AT
    6.5" DOWN, 2" RIGHT
    -ADD CLIENT_A_LOGO.JPG AT
    1" DOWN, 6" RIGHT
BACK:
    -ADD DISCLAIMER CLAUSE TEXT AT
    7" DOWN, 4" RIGHT

~600

DYNAMIC REVISION OF PAGE DESCRIPTION LANGUAGE PRINT JOBS THAT USE PREPRINTED FORMS

FIELD OF THE INVENTION

The invention relates to the field of printing, and in particular, to print jobs that utilize preprinted forms.

BACKGROUND

In the field of printing, it is not uncommon for a print shop to receive jobs which are intended for marking onto preprinted forms (also referred to as "preprinted media") that have already been marked (i.e., printed) with content. For example, certain jobs may be intended for marking onto a preprinted letterhead, a preprinted template for a credit card statement, etc. Such preprinted forms help to ensure that certain pieces of content such as logos are printed at a consistent level of quality for customers.

While preprinted forms have certain benefits in a print shop, they also incur consequences. First, sheets or rolls of preprinted forms must be loaded into printers for printing, and printers have limited capacity for storing different types of media. For example, a cut-sheet printer may have a limited number of trays or bins for storing paper. The bins store types of media having a variety of sizes, colors, weights, and coatings. When media are also varied by type of preprinted content, it may become impossible to store all desired types of media at the printer. Such a system may additionally increase the amount of labor involved with restocking print media at printers, because it means that those printers have to be restocked with more types of media. Further compounding the problem, print shops may store newly received print media in humidity controlled chambers for days or weeks in order to ensure that a desired level of moisture content is achieved before printing. In environments where preprinted forms are used, they must also be treated in this manner. If no preprinted forms exist at the print shop at the desired level of moisture content, then printing may be delayed or halted altogether until the preprinted forms are properly acclimated to the print shop.

Print shop operators encounter further problems with preprinted forms when attempting to remove preprinted forms defined in a print job received at the print shop. For example, print jobs may be received in a Page Description Language (PDL) format, such as Portable Document Format (PDF) or Advanced Function Presentation (AFP). These PDL formats may themselves explicitly indicate which types of media to use, may include hints for types of media, and/or may be accompanied by job tickets that refer to specific types of media. In order to remove preprinted forms from a print job defined in PDL, it is not uncommon to have to load non-PDL source data for the print job in a composition tool that was originally used to create the print job, alter print media settings for the non-PDL source data for the print job in the composition tool, generate an entirely new PDL version of the print job from the non-PDL source data for the print job (i.e., from scratch), and submit the new PDL version of the print job to a printer for printing. For print jobs with tens of thousands of pages, such modifications are slow, manual processes that may take hours or days to complete, even when performed by a skilled print shop operator.

For at least these reasons, those who operate print shops continue to seek out enhanced techniques for managing print jobs that call out specific types of preprinted forms.

SUMMARY

Embodiments described herein provide systems and methods that dynamically integrate PDL into a print job in order to replace preprinted forms with blank media that will be marked (e.g., with toner or ink) to match the appearance of those preprinted forms. This may involve merging PDL instructions directly into the PDL print data of a print job. In further embodiments, the techniques described herein selectively decide whether or not to replace preprinted forms with blank media. In still further embodiments, the techniques described herein may dynamically change a print job from a simplex job (including only PDL print data for only front sides of sheets) to a duplex job, in order to match the appearance of preprinted forms which have preprinted content on back sides of sheets.

One embodiment is a system that includes a memory that stores a number of entries (i.e., one or more entries) which include Page Description Language (PDL) instructions for marking blank print media to match a number of types of preprinted forms (i.e., one or more types of preprinted forms), and an interface that receives a print job comprising PDL print data. The system also includes a controller that determines that the print job includes a media callout referring to one of the types of preprinted forms, consults an entry that corresponds with the type of preprinted form, integrates PDL instructions from the entry into PDL print data for an existing page of the print job to match an appearance of the type of preprinted form at the existing page, selects a printer, and transmits the print job to the printer for printing after the PDL instructions have been integrated.

A further embodiment is a method that includes receiving a print job comprising Page Description Language (PDL) print data, determining that the print job includes a media callout referring to a type of preprinted form, and consulting an entry stored in memory that corresponds with the type of preprinted form and includes PDL instructions for marking blank print media to match an appearance of the type of preprinted form. The method further includes integrating PDL instructions from the entry into PDL print data for an existing page of the print job to match the appearance of the type of preprinted form at the existing page, selecting a printer, and transmitting the print job to the printer for printing after the PDL instructions have been integrated.

A further embodiment is a non-transitory computer readable medium embodying programmed instructions which, when executed by a processor, are operable for performing a method. The method includes receiving a print job comprising Page Description Language (PDL) print data, determining that the print job includes a media callout referring to a type of preprinted form, and consulting an entry stored in memory that corresponds with the type of preprinted form and includes PDL instructions for marking blank print media to match an appearance of the type of preprinted form. The method further includes integrating PDL instructions from the entry into PDL print data for an existing page of the print job to match the appearance of the type of preprinted form at the existing page, selecting a printer, and transmitting the print job to the printer for printing after the PDL instructions have been integrated.

A further embodiment is a non-transitory computer readable medium embodying programmed instructions which, when executed by a processor, are operable for performing a method. The method includes receiving a print job that includes media callouts for at least one type of preprinted form, and determining whether an entry exists which provides Page Description Language (PDL) instructions for marking blank print media to match an appearance of the type of preprinted form. In the case that the entry exists, the method includes identifying pages of PDL print data in the print job having media callouts for the type of preprinted form, merging the PDL instructions provided by the entry with the pages of PDL print data, and printing the print job with blank print media instead of the type of preprinted form. In the case that the entry does not exist, the method includes printing the print job with copies of the preprinted form that are already stored at a printer.

A still further embodiment is a non-transitory computer readable medium embodying programmed instructions which, when executed by a processor, are operable for performing a method. The method includes receiving a simplex print job that includes media callouts for at least one type of preprinted form that includes markings on a back side, identifying Page Description Language (PDL) instructions for marking blank print media to match an appearance of the type of preprinted form, integrating the PDL instructions with pages of PDL print data at the print job, and designating the simplex print job as a duplex print job.

Yet another embodiment is a non-transitory computer readable medium embodying programmed instructions which, when executed by a processor, are operable for performing a method. The method includes receiving a print job that includes media callouts for at least one type of preprinted form, identifying Page Description Language (PDL) instructions for marking blank print media to match an appearance of the type of preprinted form, determining whether the print job comprises a reprint, and selectively integrating the PDL instructions into the print job, based on whether the print job comprises a reprint.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 6 is a block diagram illustrating an entry in a media catalog in an illustrative embodiment.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
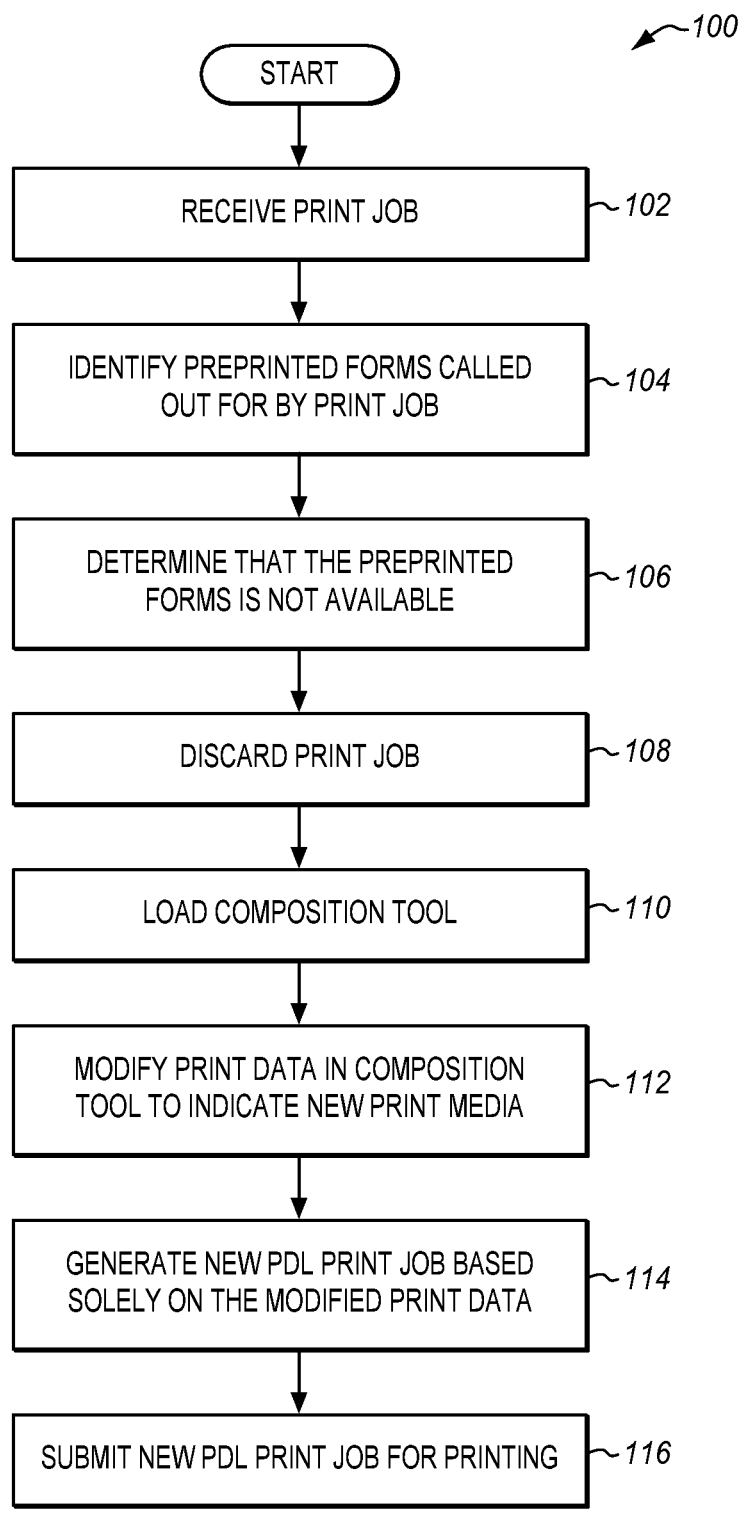
FIG. 1 is a flowchart of a prior art method for replacing a print job with a new print job in order to account for a change in media.

FIG. 1 is a flowchart of a prior art method 100 for replacing a print job with a new print job in order to account for a change in media. Specifically, FIG. 1 illustrates the numerous and laborious steps involved in attempting to print a print job that required use of preprinted forms, when no preprinted forms were available at a print shop.

According to method 100, a print shop operator would receive a print job that included Page Description Language (PDL) print data from a customer (step 102). The print shop operator would then determine that the print job referred to preprinted forms (step 104). The print shop operator would further determine that the preprinted forms were not available at the print shop (step 106). For example, no printers at the print shop may have been loaded with the preprinted forms, no preprinted forms may have yet been acclimated to the print shop, or a printer may otherwise not have had a sufficient number of preprinted forms to service the print job. This meant that the print job had to be discarded, because it could not be printed at the print shop (step 108). The print shop operator would then be required to load the composition tool that generated the print job in the first place, or to request that the customer do so (step 110). For example, a composition tool may comprise an editing program that stores a file of print data in a non-PDL source format. Such a composition tool may be used to edit the file, and then may utilize a print driver at a computer to generate a new PDL version of a print job for printing. Such programs may include Microsoft Word, the Scribus print layup program, etc.

With the composition tool loaded, non-PDL source data would be modified by changing media callouts within the file manually to indicate a new type of print media (step 112). The composition program would have to generate a new PDL print job having the changed media callouts, and this new PDL print job would be based solely on the source data that was modified (step 114). That is, the new PDL print job would have to be generated "from scratch" and without reference to the original PDL print job (a process taking many hours). Finally, the new PDL print job would be submitted to a printer for printing (step 116). For large print jobs having tens of thousands of pages, this process would take numerous hours, and still would not address all customer concerns, because the resulting printed output of the print job would appear different from what was originally intended by the customer (owing to differences caused by the change in media type). As such, there has been a long-felt need in the industry for a convenient and straightforward technique of addressing the inadequacies found in the method described above.

Figure 2:
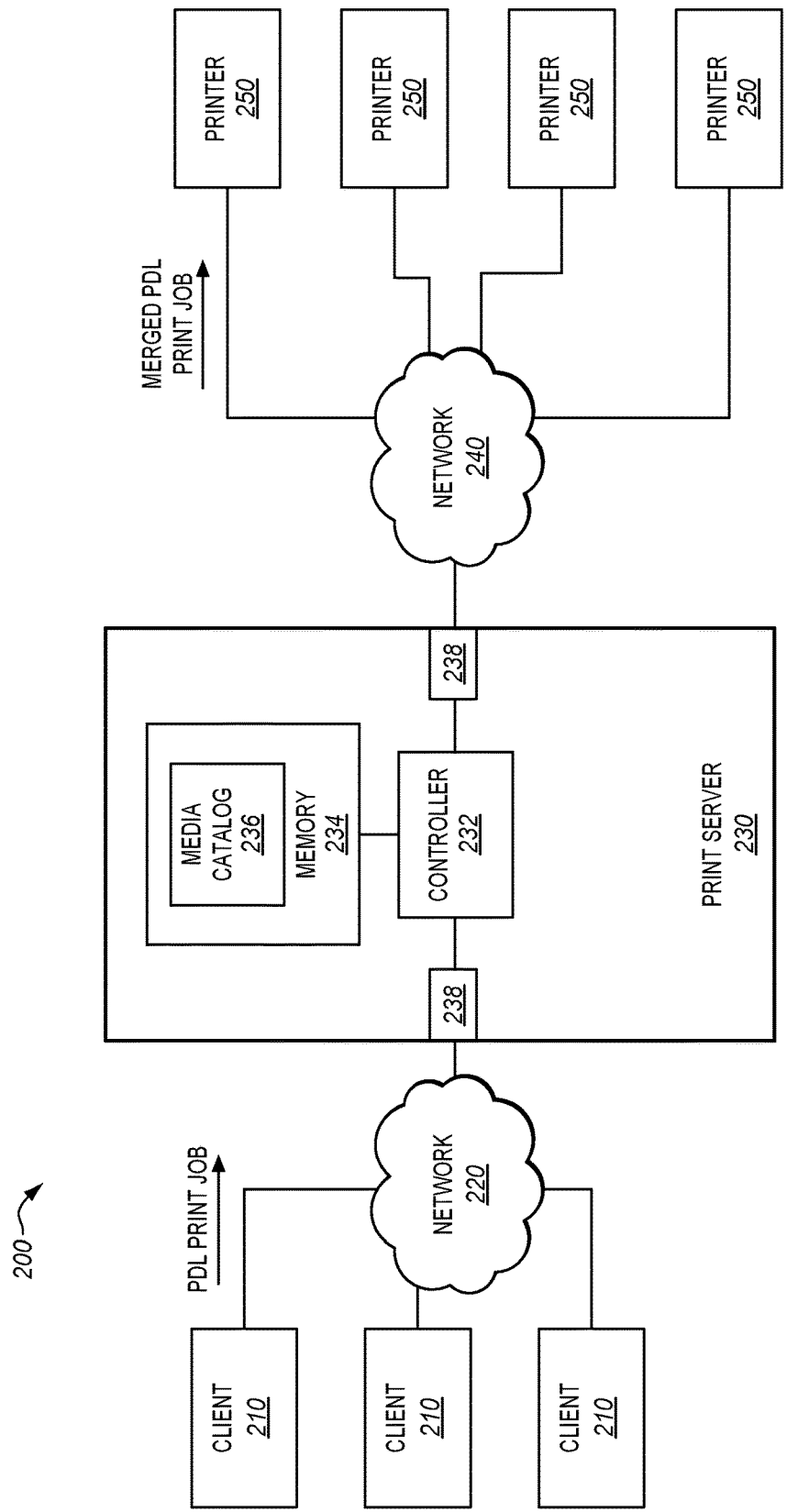
FIG. 2 is a block diagram of a printing system that dynamically modifies PDL at incoming print jobs in order to use blank media in place of preprinted forms in an illustrative embodiment.

FIG. 2 is a block diagram of a printing system 200 that dynamically modifies PDL at incoming print jobs in order to use blank media in place of preprinted forms in an illustrative embodiment. Printing system 200 comprises any suitable combination of systems, components, or devices that are capable of merging PDL instructions into incoming print jobs in order to eliminate the need for preprinted forms when printing those print jobs. Thus, printing system 200 provides a substantial benefit in addressing the numerous issues with preprinted media described above.

In this embodiment, printing system 200 receives PDL print jobs from clients 210 via network 220. Specifically, an interface (I/F) 238 receives PDL print jobs for printing. An I/F 238 may comprise an Ethernet interface, a wireless interface in compliance with IEEE 802.11 standards for wireless networking, etc. Clients 210 may comprise general purpose computers, servers, or other devices, and network 220 may comprise a local internet, the Internet, etc.

PDL print jobs received at print server 230 are stored in memory 234 by controller 232. Controller 232 identifies media callouts in incoming print jobs, such as media callouts within the PDL itself, media callouts at Page Level Exceptions (PLEs) defined within a Job Definition Format (JDF) job ticket for the print job, etc. Controller 232 analyzes these media callouts to identify types of preprinted forms intended for use as print media for the print job. Controller 232 then determines whether media catalog 236 stores an entry for a type of preprinted form indicated by the media callout. If a suitable entry exists, then controller 232 merges new PDL instructions from the entry into the print job. These new PDL instructions are used to mark blank print media to match the appearance of the type of preprinted form and, if necessary, to modify the media callout for the preprinted form. This eliminates the need for keeping the preprinted form loaded at a printer, and enables the print job to be printed at a wider variety of printers.

When integrating the PDL instructions with the existing PDL print data, proper mixing rules should be used in ensure a high level of print fidelity. These mixing rules may indicate layering of PDL instructions, such that PDL instructions for the preprinted form are placed below/behind PDL print data of the print job. In such a manner, PDL print data for the print job may be overlaid on top of the PDL instructions that replicate the appearance of the preprinted form.

In one example, simply placing an image on the bottom of a logical page does not guarantee a correct printed output unless mixing rules provide functionality that corresponds with real paper. For example, an existing page may include PDL print data for placing "white" text onto a preprinted logo area. White text is not printed on the pre-printed form. However, if there is an electronic logo (e.g., PDL instructions for a logo) placed behind this white text, one set of mixing rules may remove the portion of the electronic logo corresponding to the white text. When inserting PDL instructions, it is desirable to ensure that white text in print data for the print job does not remove any portion of such a logo, otherwise the white words would effectively appear on the logo. Thus, controller 232 may ensure that the mixing rules for PDL print data and PDL instructions ensure that the printed output matches the appearance of the preprinted form being replaced. Different PDL formats allow this to be done in different manners. For example, AFP print data may be merged according to techniques described in U.S. Pat. No. 8,896,896 B2. For PDF print data, this may involve the use of mixing rules.

Alternatively, if no entry exists, controller 232 may proceed to continue using the preprinted form, and may forego the merging process. Controller 232 may be implemented as custom circuitry, as a hardware processor executing programmed instructions, etc. Print server 230 may comprise a general purpose computer implementing a dedicated server.

PDL print jobs that have been merged are sent via an I/F 238 and network 240 to one or more printers 250 for printing. Note that in further embodiments, I/Fs 238 may be implemented as the same physical interface, and network 220 and network 240 may be implemented as the same network.

The particular arrangement, number, and configuration of components described herein is illustrative and non-limiting. Illustrative details of the operation of printing system 200 will be discussed with regard to FIG. 3. Assume, for this embodiment, that a customer using client 210 has completed generation of a print job that includes PDL print data. Further, assume that client 210 has transmitted the print job for printing to printing system 200.

Figure 3:
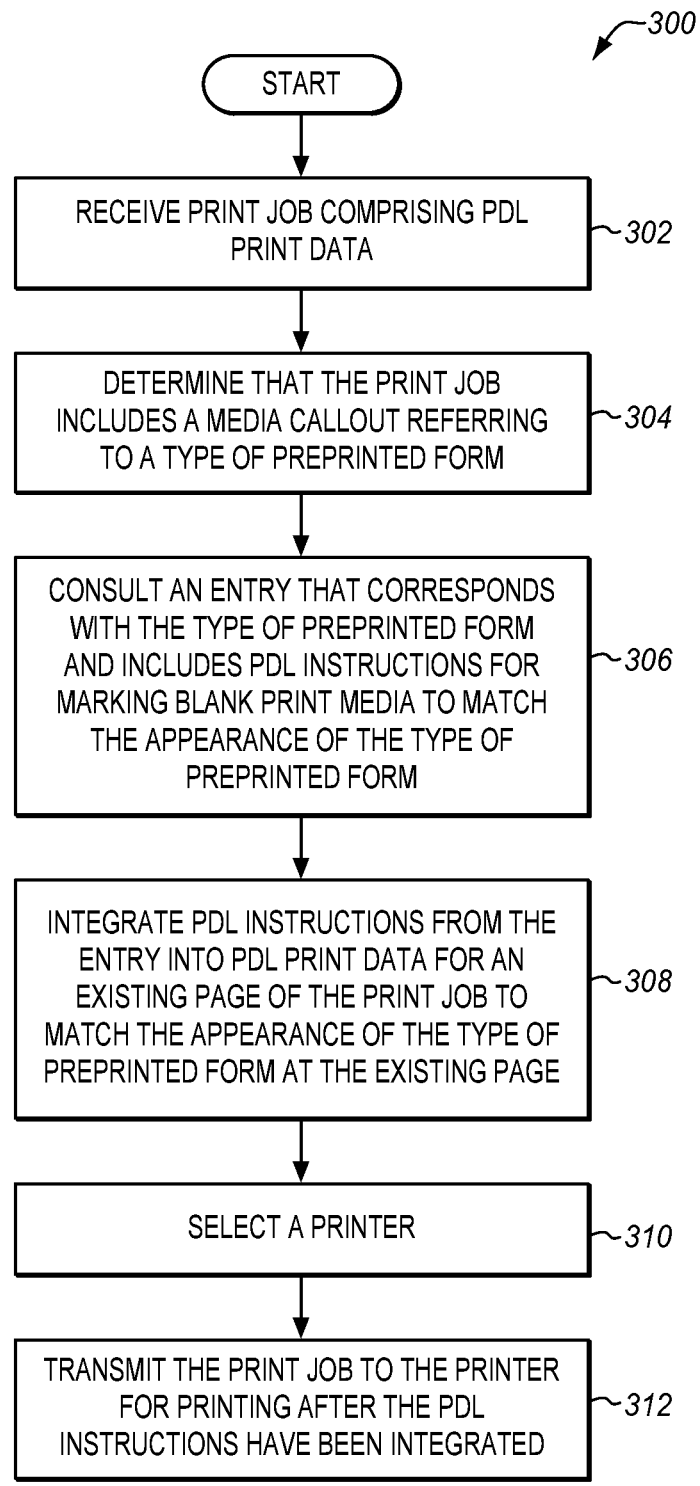
FIG. 3 is a flowchart illustrating a method for operating a printing system to utilize blank media instead of preprinted forms in an illustrative embodiment.

FIG. 3 is a flowchart illustrating a method 300 for operating a printing system 200 to utilize blank media instead of preprinted forms in an illustrative embodiment. The steps of method 300 are described with reference to printing system 200 of FIG. 2, but those skilled in the art will appreciate that method 300 may be performed in other systems. The steps of the flowcharts described herein are not all inclusive and may include other steps not shown. The steps described herein may also be performed in an alternative order.

Print server 230 receives the print job, which includes logical pages of PDL print data, at I/F 138 (step 302). As used herein, a "logical page" of a print job comprises instructions for printing content at a side of a physical sheet of print media (e.g., paper). Thus, a physical sheet of paper corresponds with one logical page of print data when printing in simplex, and corresponds with two logical pages of print data when printing in duplex. A logical page may also be referred to simply as a "page."

Controller 232 determines that the print job includes a media callout referring to a type of preprinted form (step 304). For example, if the print job is a Portable Document Format (PDF) print job, media callouts may be indicated within Page Level Exceptions (PLEs) in a Job Definition Format (JDF) job ticket. Alternatively, if the print job is received in an Advanced Function Presentation (AFP) format, controller 232 may determine media callouts by analyzing medium maps stored in an AFP form definition (FORMDEF) resource, or may determine media callouts based on an accompanying mapping file. These formats are provided by way of example and are not intended to be limiting; other formats could also potentially be used with the invention. The type of preprinted form may be indicated, for example, explicitly by name in the callout, may be indicated by a combination of media properties (e.g., size, weight, color, coating), or may be indicated by a bin or tray number. For incoming AFP, a configuration for an original print job may specify a specific mapping table of tray/bin number to a media name/entry in media catalog 236. Such a mapping table may be used to convert old AFP print files that refer to a bin/tray number. For incoming PDF print jobs having JDF job tickets, a media callout may comprise a media name reference. However, if the incoming PDF only includes hints, and those hints refer to a bin/tray number, the mapping table described above may again be used. The hints may then be converted into JDF instructions which are revised along with the PDF print data.

In any case, the type of preprinted form includes preprinted content which does not exist on blank print media. Such content may comprise text, images, logos, letterhead, etc. Hence, it is not possible to simply replace the preprinted form with blank media, because the resulting output from a printer would be missing this preprinted content.

Having determined the type of preprinted form referred to by the print job, controller 232 opens media catalog 236 stored in memory 234, and consults an entry that corresponds with the type of preprinted form (step 306). Each entry includes PDL instructions for marking blank print media to match the appearance of a different type of preprinted form. For example, the PDL instructions may direct a printer to mark a piece of blank print media with text and/or images in locations where similar/identical text and/or images are located in a preprinted form.

Assuming that an entry has been located for the type of preprinted form, controller 232 integrates (i.e., merges) PDL instructions from the entry into PDL print data for an existing page of the print job, in order to match the appearance of the preprinted form at the existing page (step 308). That is, controller 232 locates a page that is already defined in the print job (e.g., a page that includes its own PDL print data), and adds PDL instructions that cause the page to match the appearance of the type of preprinted form. This allows for blank print media to be used instead of the preprinted form when printing the page. If the print job refers to multiple types of preprinted forms, steps 304-308 may be repeated for each type of preprinted form, each page of the print job, etc.

In further embodiments, controller 232 may selectively elect to forego step 308, based on a number of criteria. For example, controller 232 may forego step 308 if the number of pages in the print job that refer to the type of preprinted form is less than a threshold number (e.g., ten, or one hundred). In still further embodiments, controller 232 may determine that the print job is a "reprint" of selected documents (e.g., credit card statements) from a prior print job that were damaged, and may elect to forego step 308 for the reprint. This causes the print job to be printed using the type of preprinted form that was originally indicated in the media callouts for the job. For example, in a circumstance where the original print job was printed on a high-speed continuous-forms printer, but the reprint is being performed at a cut-sheet printer that already stores the preprinted form in a bin, it may be desirable to bypass the merging process. Similarly, PDL instructions may be selectively inserted based on a variety of properties of the reprint, such as the type of reprint being performed, a printer performing the reprint, which pages are being reprinted, etc. This technique allows controller 232 to selectively integrate PDL instructions into a print job, based on whether the print job is a reprint. In this manner, controller 232 may selectively decide whether or not the type of preprinted form is actually used during printing.

Controller 232 further selects a printer 250 (step 310). This operation may comprise identifying printers 250 that are capable of printing the merged print job, and then selecting one of the available printers 250 based on queue size, an estimated time of completion, etc. Controller 232 further transmits the merged print job to the selected printer 250 for printing (step 312), after the PDL instructions have been integrated (as described in step 308).

Method 300 provides a substantial benefit over prior techniques for numerous reasons. First and foremost, method 300 eliminates the need for loading, acclimating, and storing various preprinted forms at printers within a print shop, because method 300 allows blank media to be used in place of preprinted forms.

Second, because method 300 is performed at the PDL level, method 300 does not require the use of specialized hardware, and the merged print jobs generated by method 300 may be sent to any desired printer at the print shop. For example, hypothetically modifying a print job during rasterization to replace preprinted forms with blank print media would be less suitable than method 300. Not all print shops have complex printers capable of altering data during rasterization, and time spent at complex printers is highly valuable. Furthermore, moving a print job to a new printer after the print job was modified in such a manner would require re-rasterizing the print job for the new printer, resulting in a substantial time delay.

Third, the integration process of method 300 is selectively performed, which enables print shop operators to selectively utilize types of preprinted forms as desired (such as for small print jobs or reprints). This flexibility ensures that print shop operators may utilize print jobs in a customizable manner.

Additionally, by combining the original PDL print data of the print job with new PDL instructions at a print server 230 that is upstream from printers 250, a print shop operator can decide when to create a merged print job. That is, the merged print job does not have to be created at the time of printing, but rather can be created before printing occurs. This means that the merged print job can be created in PDF and then transformed to another PDL for printing if desired. The merged print job can also be created and written to an archive, or be sent as an email attachment without printing it at all. This provides for greater flexibility in print job handling than if the print job is merged at a printer itself (e.g., as part of the rasterization process).

Figure 4:
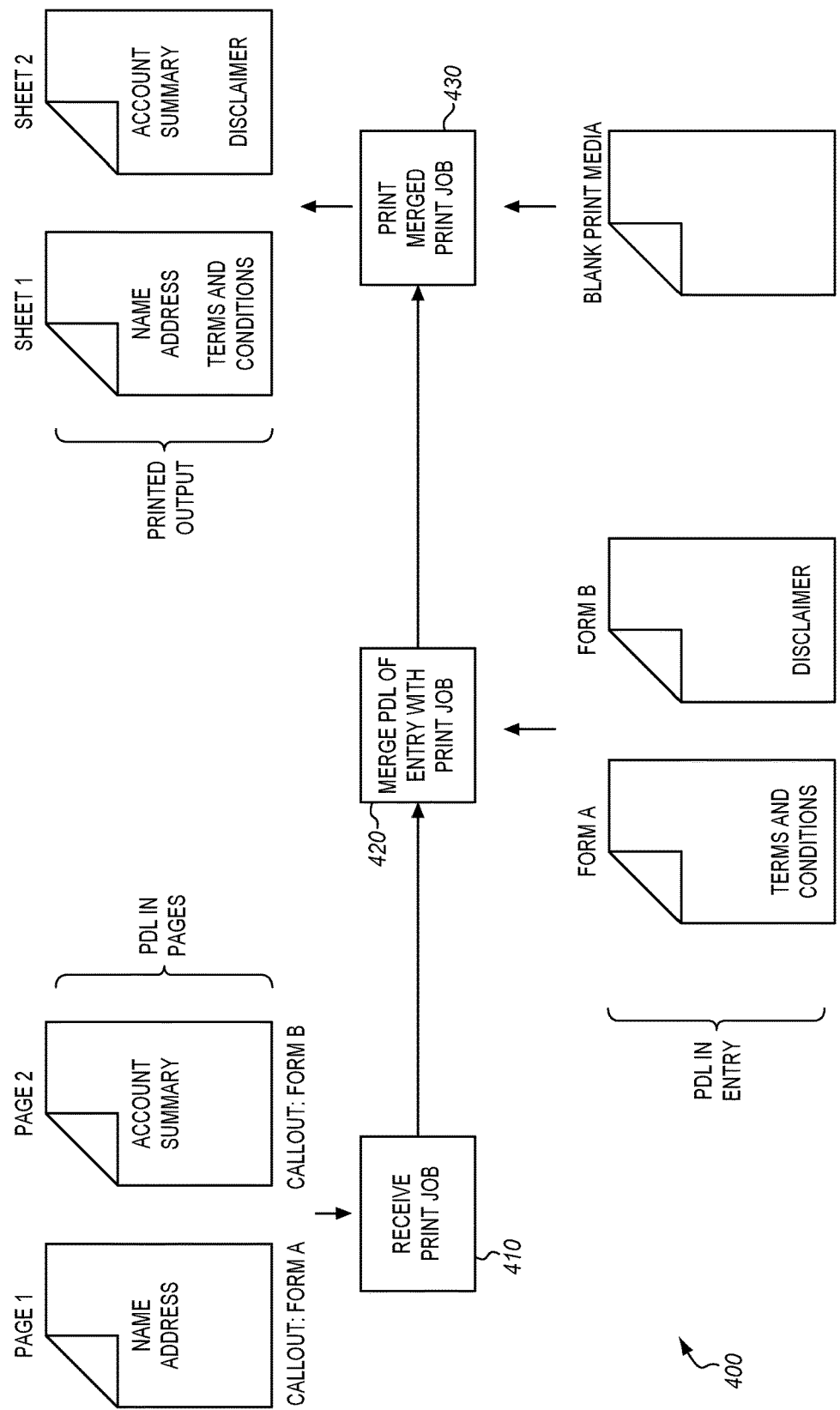
FIG. 4 is a flowchart illustrating general operational steps involved in merging new PDL content into an existing print job.

FIG. 4 is a flowchart 400 illustrating general operational steps for merging new PDL content into an existing print job. In general terms, FIG. 4 illustrates that print jobs are received at controller 232 (step 410). FIG. 4 further illustrates exemplary pages one and two, which refer to preprinted forms A and B, and include different PDL print data. Controller 232 loads PDL instructions in entries that describe these preprinted forms, and merges PDL print data in the pages with PDL instructions from corresponding entries in media catalog 236 Controller 232 further directs a printer to print the merged print job (e.g., from blank print media) (step 430). This results in printed output comprising sheets that are marked based on PDL print data from the original print job, as well as PDL instructions from the entries in media catalog 236.

Preprinted content kept on preprinted forms may be present on one or both sides of a physical sheet, regardless of whether the preprinted forms are stored as cut sheets or rolls of continuous-forms media. It is not uncommon for print jobs to mark only one sheet side of a preprinted form, without marking the other sheet side of the preprinted form. Thus, simplex print jobs that utilize two-sided preprinted forms may appear to be double sided when finally output from a printer.

Figure 5:
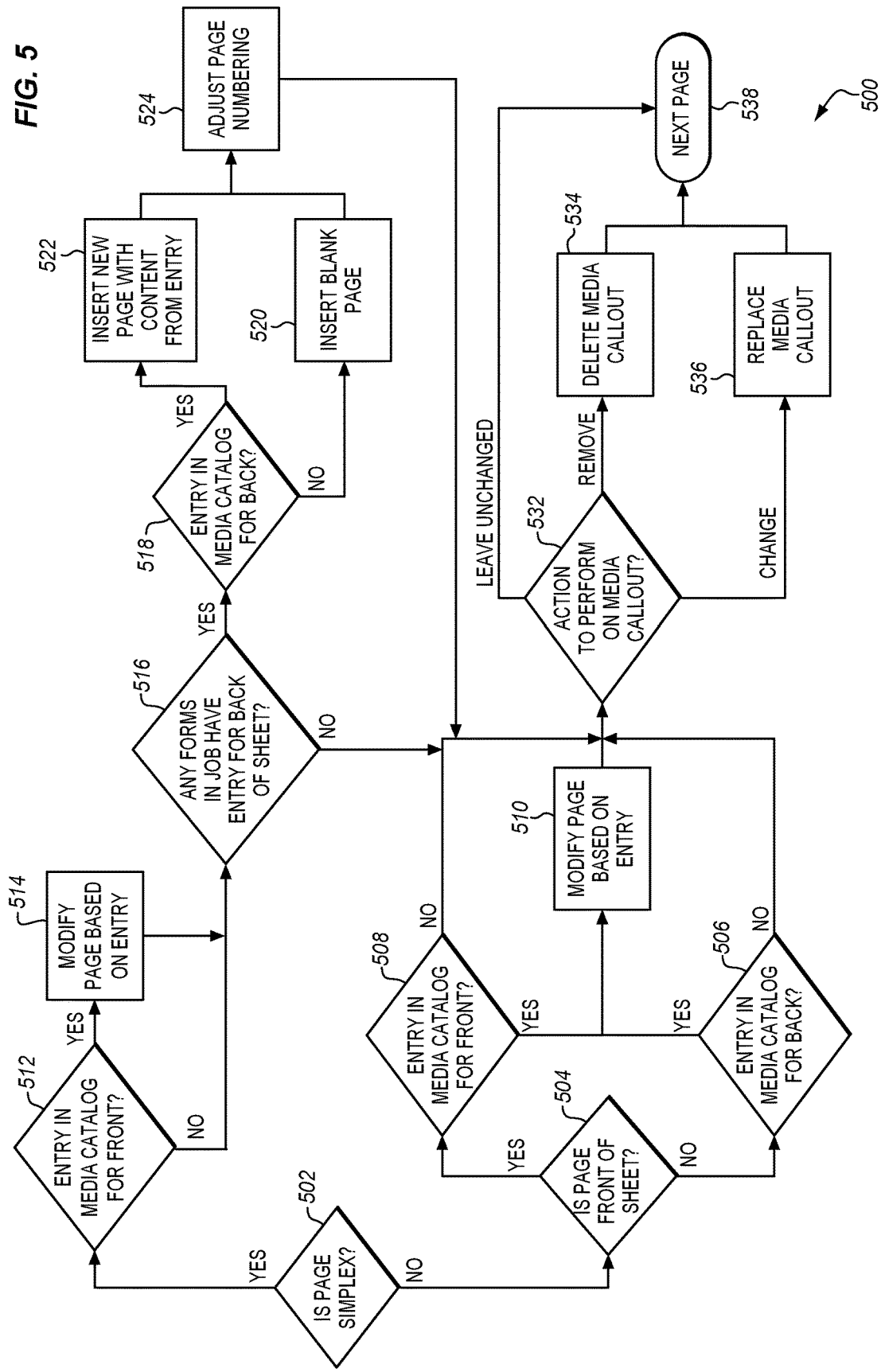
FIG. 5 is a flowchart illustrating additional details of merging new PDL content into an existing print job in an illustrative embodiment.

FIG. 5 is a flowchart 500 illustrating additional details of merging new PDL content into an existing print job in an illustrative embodiment, in accordance with step 420 of FIG. 4. The steps of flowchart 500 illustrate how to integrate PDL instructions into pages of a print job, regardless of whether a preprinted form used by that print job is simplex or duplex, and regardless of whether the print job itself is simplex or duplex. For example, a print job may be changed from simplex (one-sided) to duplex (two-sided) in order to supply PDL instructions for both the front sheet side and the back sheet side of a two-sided preprinted form. The method of flowchart 500 engages in such a simplex to duplex transformation upstream from printers 250. Thus, any resulting PDL print job can be passed to any printer 250 capable of handling simplex or duplex AFP or PDF files. Jobs intended for cut sheet printers may include simplex pages, duplex pages, and callouts to multiple types of preprinted forms. Thus, the process involved in changing a print job from simplex to duplex, especially when accounting for media callouts to preprinted forms, is intricate.

According to FIG. 5, controller 232 engages in a page-by-page process of analyzing the print job. Steps 502-538 may therefore be performed for each logical page of the print job. Assume, for this embodiment, that a logical page of a print job has been selected, and that the logical page refers to a preprinted form to be used as print media for that logical page. Controller 232 determines whether the current logical page is a simplex page or a duplex page (step 502). That is, controller 232 determines whether the current logical page is intended for printing with other pages in a duplex format. Phrased another way, controller 232 may determine whether PDL print data for the print job includes instructions for printing on one or both sides of a physical sheet. Steps 504-510 illustrate processing of duplex pages, while steps 512-516 illustrate processing of simplex pages.

If the logical page is a duplex page, controller proceeds to step 504, and determines whether the logical page is for a front side of a physical sheet, or a back side of a physical sheet. If the logical page is for a front side, controller 232 determines whether an entry in media catalog 236 includes PDL instructions for a front side of the preprinted form (step 508). If such PDL instructions exist, controller 432 modifies the page based on the entry, by integrating the PDL instructions into the page (step 510). This process allows a sheet of blank print media to stand in for the type of preprinted form. Alternatively, if no PDL instructions exist in the media catalog 236 for the front side of the preprinted form, processing continues to step 532.

If the logical page was for a back side of a physical sheet, then controller 232 determines whether an entry in media catalog 236 includes PDL instructions for a back side of the preprinted form (step 506). If such PDL instructions exist, controller 432 modifies the page based on the entry, by integrating the PDL instructions into the page (step 510). Alternatively, if no PDL instructions exist in the media catalog 236 for the back of the preprinted form, processing continues to step 532.

If the logical page was part of a simplex print job as determined in step 502, then controller 232 decides whether an entry in media catalog 236 includes PDL instructions for the front side of the preprinted form, in step 512. If an entry does exist, then controller 232 modifies the page based on the entry by integrating the PDL instructions into the page (step 514), and proceeds to step 516. Alternatively, if no entry includes PDL instructions for the front side of the preprinted form, then controller 232 proceeds directly from step 512 to step 516.

Steps 516-524 provide a technique for dealing with simplex print jobs that refer to preprinted forms that are printed on both sides. Steps 516-524 address this issue by transforming the print job into a duplex job, interleaving new pages into the print job for back sheet sides, and including new PDL instructions in the new pages. This allows for the replacement of double-sided preprinted forms with blank print media, even when the preprinted forms are used by a simplex print job.

In step 516, if entries in media catalog 236 include PDL instructions for a back sheet side of any preprinted form in the print job, then processing continues to step 518. Otherwise, processing proceeds to step 532. In step 518, controller 232 determines whether an entry in media catalog 236 includes PDL instructions for a back sheet side of the preprinted form used as media by the current logical page. If so, controller 232 inserts a new logical page into the print job, and populates the new logical page with the PDL instructions in step 522. Controller 232 may further update media definitions for the print job to indicate that the print job (and/or page) is duplex. Alternatively, if no PDL instructions for a back sheet side of the preprinted form exist, controller 232 inserts a blank page in step 520. A construct which simulates a blank page could also be used. For example, a Page Level Exception (PLE) in a revisable job ticket (e.g., AFP Form Definition or Form Map) may trigger the use of blank media, or a command may cause a printer to eject paper such that a blank sheet side appears in the printed output. In one embodiment, a blank page is added by modifying a revisable job ticket in the form of an AFP Form Definition or Form Map. Controller 232 further proceeds to adjust page numbering (such as page offsets) for the print job, such as page offsets indicated in a JDF job ticket for the print job.

Steps 532-538 illustrate processing steps that are performed in order to adjust media callouts at the print the job, if desired. In step 532, controller 232 reviews the entry for the preprinted form to determine what action to perform upon the media callout for the current logical page. The available actions include leaving the media callout unchanged, removing the media callout (resulting in deletion of the media callout in step 534), and changing the media callout (resulting in replacement of the media callout with a callout for a different type of media in step 536). The media callout may remain unchanged in circumstances where operators will load a paper type that is associated with that media name because of some property that is not related to its preprinted content such as a special paper weight, paper size or finish (e.g., glossy). The media callout may be removed where a default print media for the print job is used in place of the preprinted form. The media callout may be replaced in circumstances where the preprinted form is replaced with a blank print media that is different from the default print media for the print job. For example, a yellow sheet of blank paper may be used, instead of a white sheet of blank paper. In this case, instead of the media named Yellow Letterhead, the media named Yellow would be specified in the job ticket or medium map. Processing then continues onward to the next logical page in step 538.

Using the method described in flowchart 500, print server 230 may dynamically reformat an existing print job to account for the presence of preprinted forms, even when there is a duplex/simplex mismatch between preprinted forms and the print job. This may eliminate the need to stock preprinted forms at the print shop, which saves time, labor, and money. Furthermore, because this method is performed by modifying an existing PDL-format print job, it does not require regenerating or otherwise recreating the print job, which saves additional hours of time.

FIG. 6 is a block diagram illustrating an entry 600 in a media catalog in an illustrative embodiment. In this embodiment, entry 600 is a uniquely labeled entry referred to as "FORM_65" because it is the sixty-fifth entry in a media catalog. Entry 600 is correlated with a specifically named type of preprinted form ("CLIENT_A_STMT"). In further embodiments, entry 600 may identify a preprinted form based on other properties instead of name. For example, a preprinted form may have a unique combination of weight, size, and color. Entry 600 includes an instruction to change media callouts for the preprinted form to media callouts for a sheet of blank yellow letter paper. Entry 600 also includes PDL instructions for both a front side, and a back side of the sheet of blank yellow letter paper that will replace the preprinted form. In this embodiment, the PDL instructions include boilerplate terms added to a front of the sheet, and a disclaimer clause added to a back of the sheet.

EXAMPLES

In the following examples, additional processes, systems, and methods are described in the context of a printing system that dynamically revises PDL content within print jobs to eliminate the need for preprinted forms.

Figure 7:
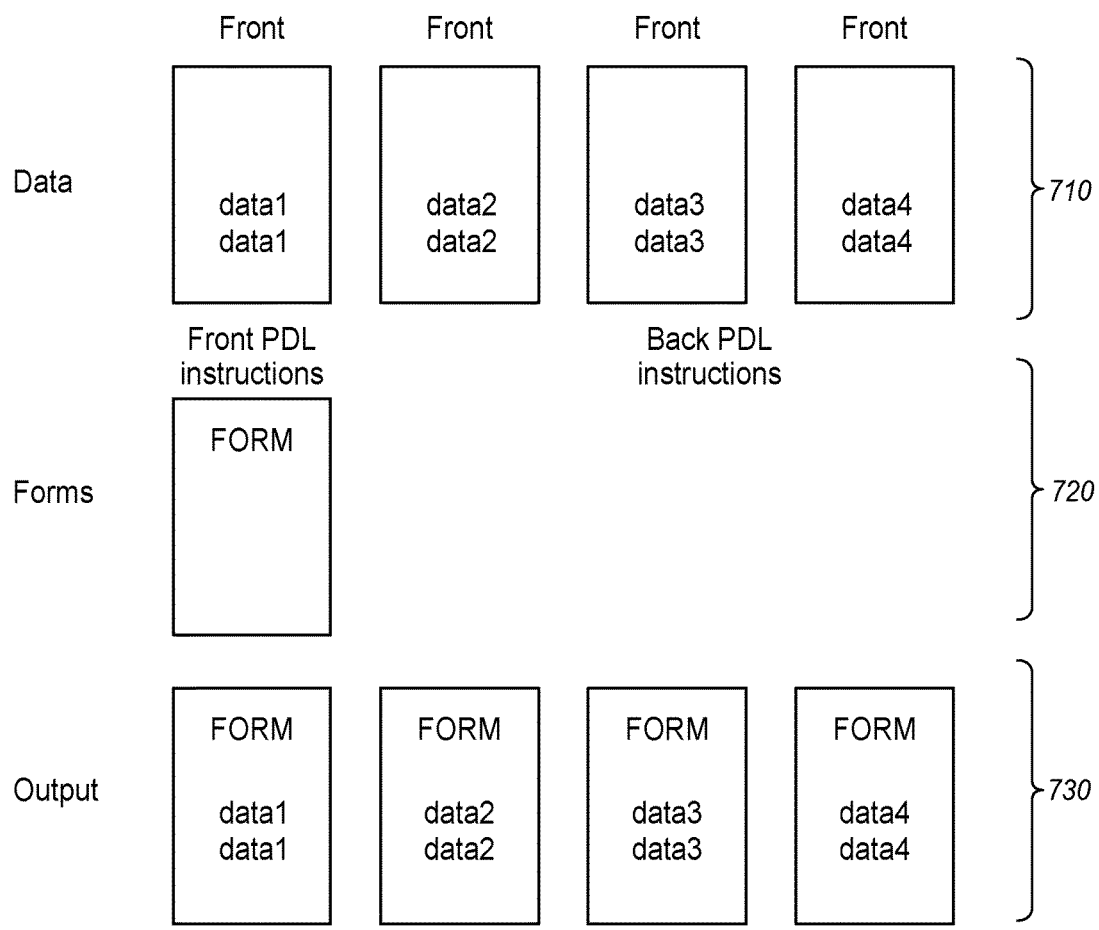
FIGS. 7-13 illustrate various techniques for merging PDL instructions into PDL print data at print jobs in order to forego the need for preprinted forms in illustrative embodiments.

FIGS. 7-13 illustrate various techniques for merging PDL instructions into PDL print data at print jobs in order to forego the need for preprinted forms in illustrative embodiments. FIG. 7 provides an example 700 where PDL print data for a simplex print job defines four logical pages 710, each with unique content (e.g., "data 1," "data 2," etc.). Furthermore, each page of the print job refers to the same preprinted form indicated by entry 720. Entry 720 has PDL instructions for marking the word "FORM" at the top of a front sheet side. These PDL instructions, when executed to mark a sheet of blank print media, cause the sheet to match the appearance of the preprinted form referenced by the pages of the print job. Entry 720 does not have any back-side instructions. Controller 232 therefore merges the PDL instructions with the PDL print data of each page 710, resulting in output 730 for printing. Thus, the need for utilizing the preprinted form is obviated, and blank print media may be used in place of the preprinted form.

Figure 8:
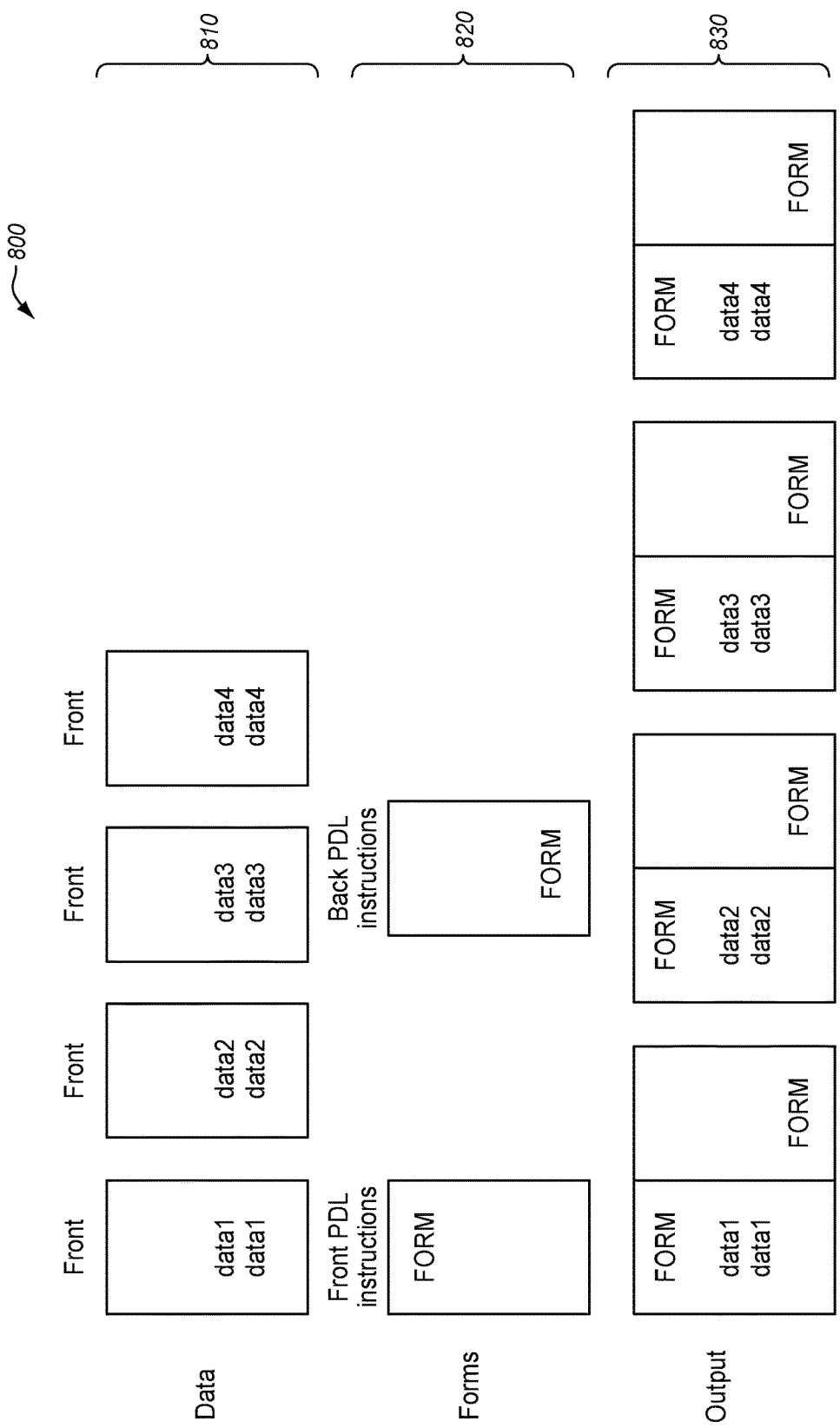

FIG. 8 provides an example 800 where PDL print data for a simplex print job defines four pages 810, each with unique content (e.g., "data 1," "data 2," etc.). Furthermore, each page of the print job refers to the same preprinted form indicated by entry 820. Entry 820 has PDL instructions for marking the word "FORM" at the top of a front side of a sheet, and for marking the word "FORM" at the bottom of a back side of the sheet. Because the preprinted form is two-sided while the print job is one-sided, controller 232 changes a job ticket of the print job to make the print job duplex instead of simplex. Controller 232 further interleaves new pages into the existing pages of the print job. These new pages will form back sides of the sheets used by pages 810. Controller 232 merges the PDL instructions with the PDL print data of each page 810, such that PDL instructions for the front sides are merged with the original pages of the print job, and PDL instructions for the back sides are merged with the new pages. This process results in output 830 for printing. Thus, the need for utilizing the preprinted form is obviated, and blank print media may be used in place of the preprinted form, even though the preprinted form is double-sided.

Figure 9:
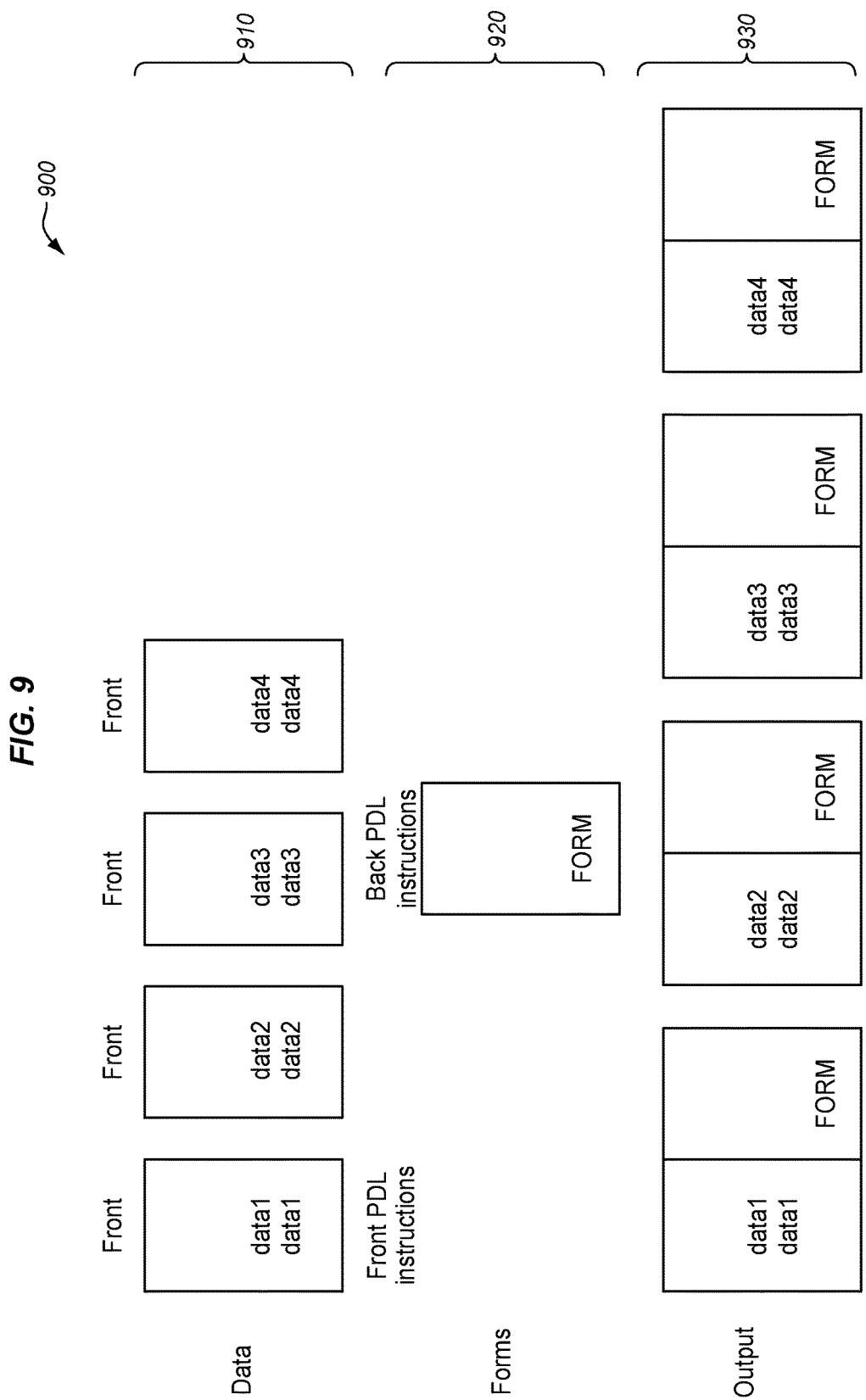

FIG. 9 provides an example 900 where PDL print data for a simplex print job defines four pages 810, each with unique content (e.g., "data 1," "data 2," etc.). Furthermore, each page of the print job refers to the same preprinted form indicated by entry 920. Entry 920 has PDL instructions for marking the word "FORM" at the bottom of a back side of a sheet. Because the entry includes instructions for a back side of a sheet while the print job is for a front side of the sheet, controller 232 changes a job ticket of the print job to make the print job duplex instead of simplex. Controller 232 further interleaves new pages into the existing pages of the print job. These new pages will form the backs sides of the sheets used by pages 910. Controller 232 merges the PDL instructions with the PDL print data of each page 910, such that PDL instructions for the back sides are merged with the new pages. This process results in output 930 for printing. Thus, the need for utilizing the preprinted form is obviated, and blank print media may be used in place of the preprinted form, even though the preprinted form is marked on a different sheet side than the original print job.

Figure 10:
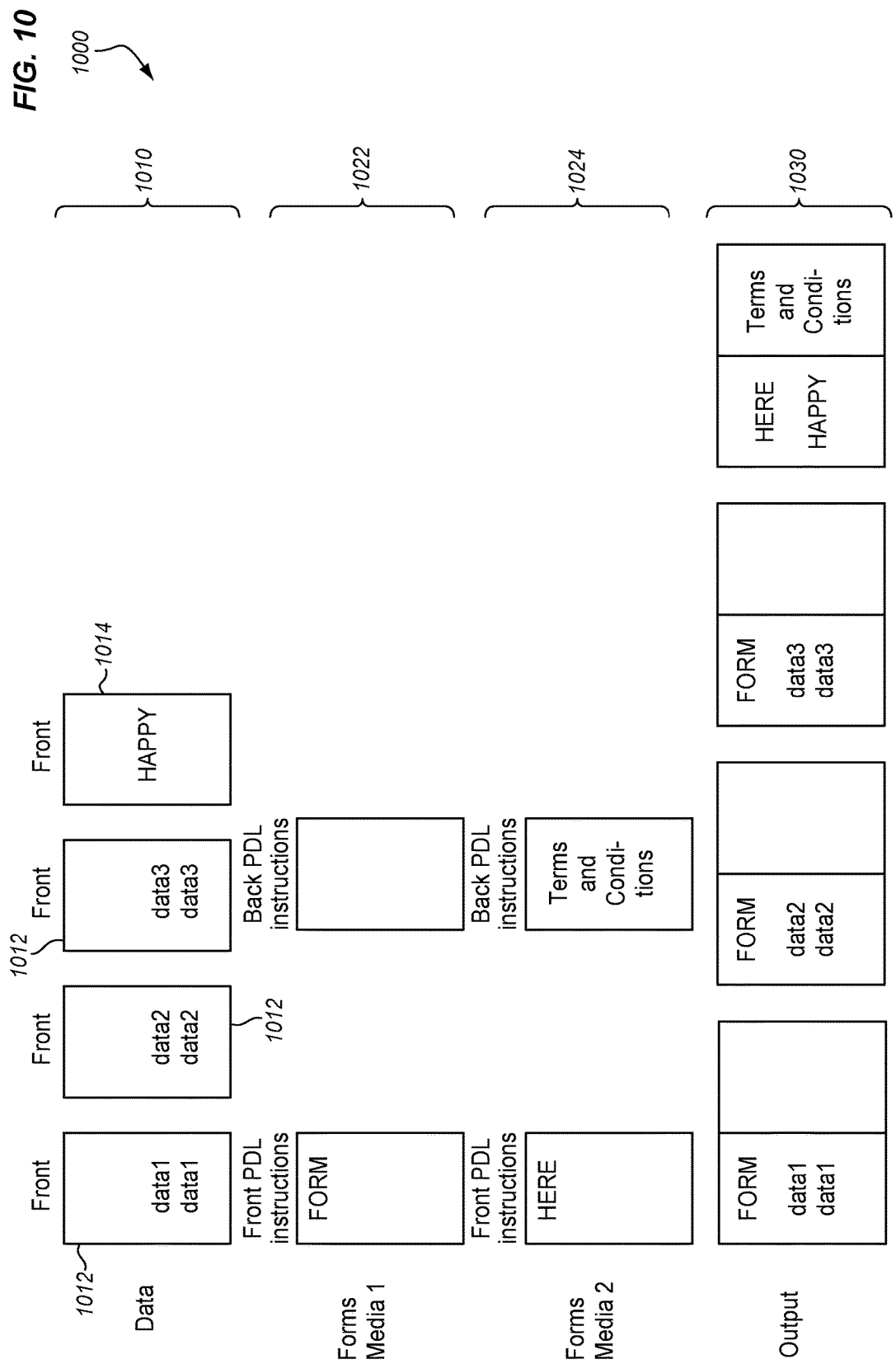

FIG. 10 provides an example 1000 where PDL print data for a simplex print job defines four pages 1010, each with unique content (e.g., "data 1," "data 2," etc.). Three pages 1012 refer to a first preprinted form indicated by entry 1022, while page 1014 of the print job refers to a second preprinted form indicated by entry 1024. Entry 1022 has PDL instructions for marking the word "FORM" at the top of a front side of a sheet, and no data on the back side of the sheet. Entry 1024 has PDL instructions for marking the word "HERE" at the top of a front side of a sheet, and for marking a set of terms and conditions at a back side of the sheet. Because at least one of the preprinted forms is two-sided while the print job is one-sided, controller 232 changes a job ticket of the print job to make the print job duplex instead of simplex. Controller 232 further interleaves new pages into the existing pages of the print job. These new pages will form the backs of the pages 1010. Controller 232 merges front-side PDL instructions in entry 1022 with the PDL print data of each page 1012, such that PDL instructions from entry 1022 are merged with the first three of the print job. Controller 232 also adds PDL instructions to print no data on the back sides of each page 1012. Controller 232 also merges front-side PDL instructions from entry 1024 with the PDL print data of page 1014, and merges back-side PDL instructions from entry 1024 with the new page added after page 1014. This process results in output 1030 for printing. Thus, the need for utilizing the preprinted forms is obviated, and blank print media may be used in place of the preprinted forms, even though multiple preprinted forms are referenced.

Figure 11:
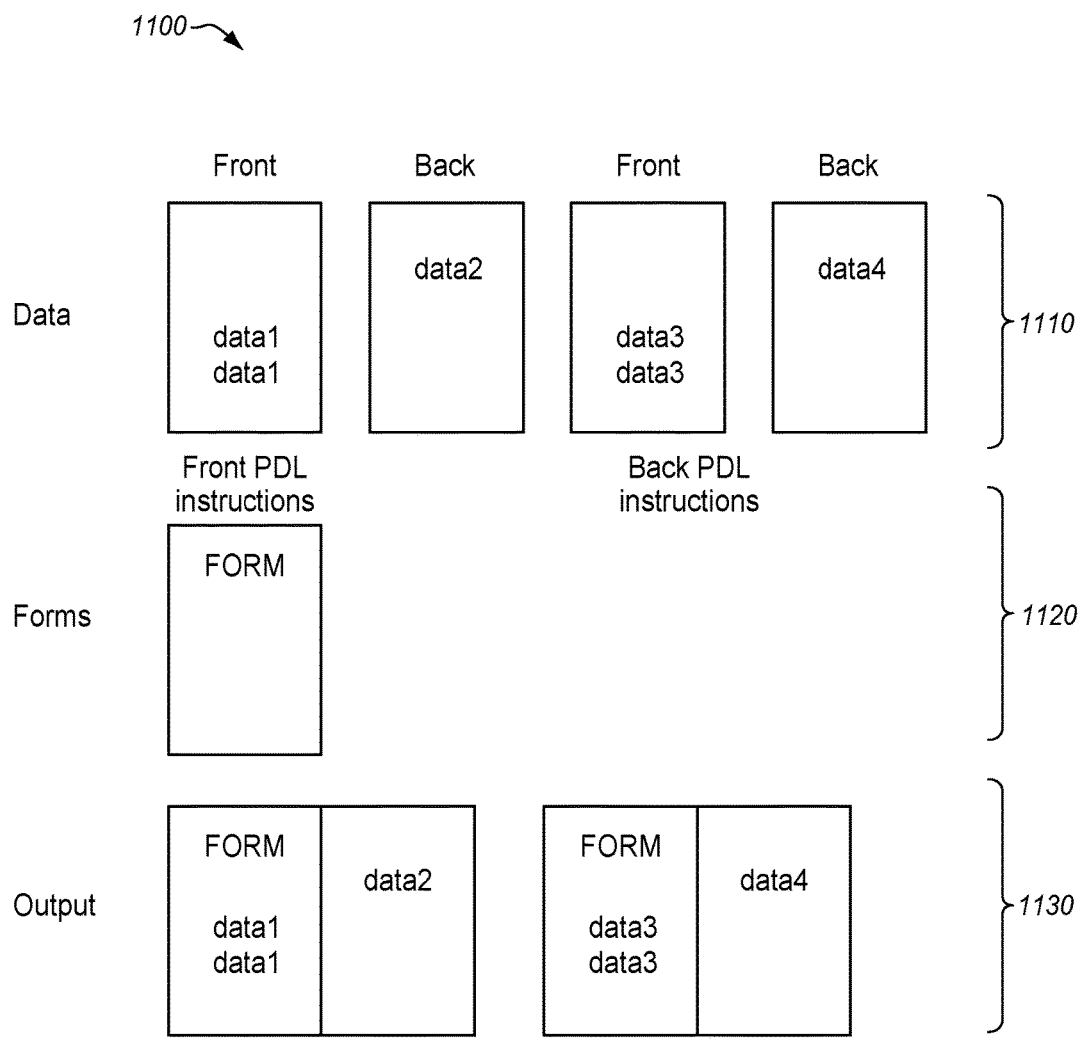

FIG. 11 provides an example 1100 where PDL print data for a duplex print job defines four pages 1110, each with unique content (e.g., "data 1," "data 2," etc.). In this example, a Page Level Exception (PLE) for the print job states that the first four pages of the print job will use the preprinted form indicated by entry 1120. Entry 1120 has PDL instructions for marking the word "FORM" at the top of a front side of a sheet. Because the preprinted form is one-sided while the print job is double-sided, controller 232 leaves the print job as a duplex job instead of a simplex job. Controller 232 merges the PDL instructions from entry 1120 with the PDL print data of the first four pages 1110. Thus, PDL instructions from entry 1120 are merged with each front-side page 1110 of referred to by the PLE, such that PDL instructions in entry are merged with alternating pages within the page range of the PLE. This process results in output 1130 for printing. Thus, the need for utilizing the preprinted form is obviated, and blank print media may be used in place of the preprinted form for specific page ranges indicated by PLEs.

Figure 12:
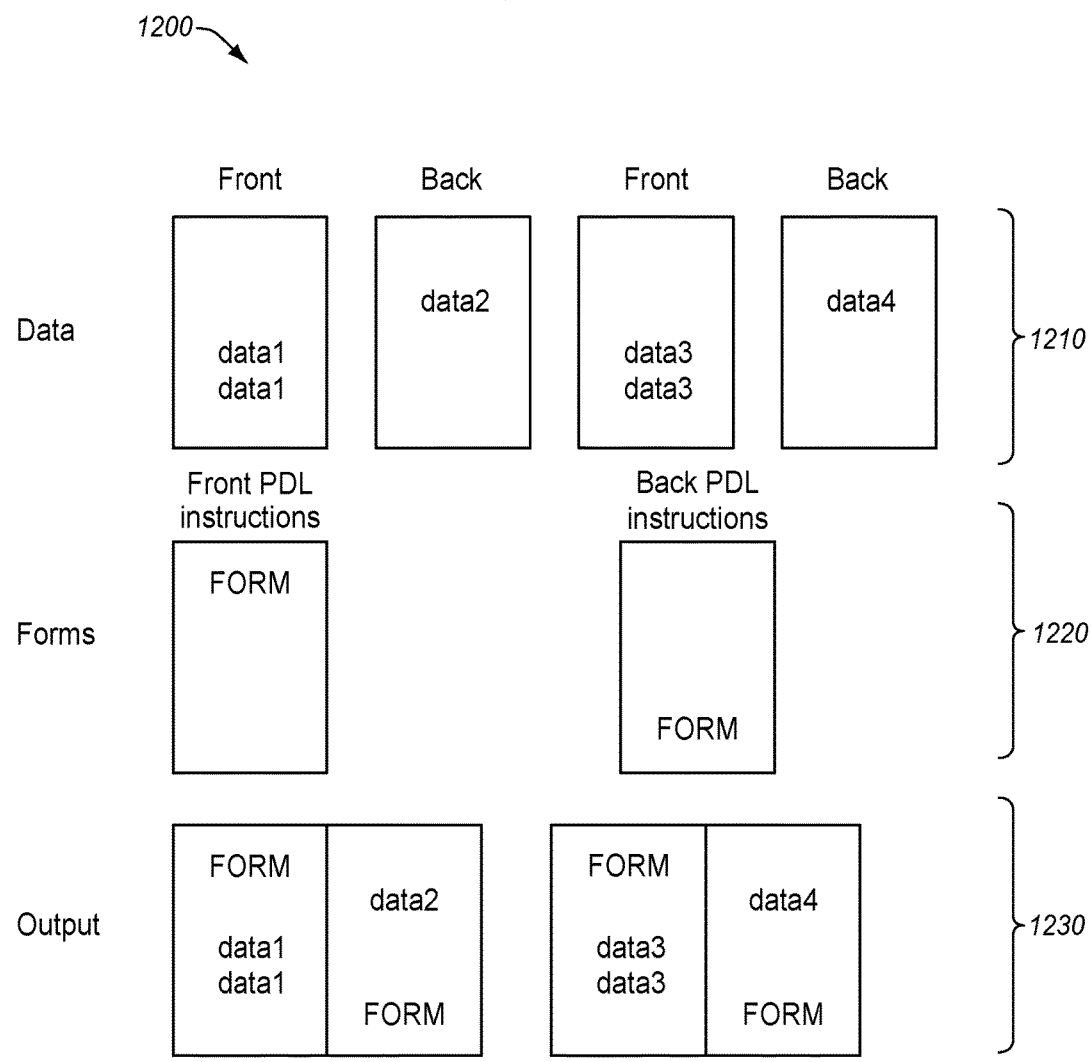

FIG. 12 provides an example 1200 where PDL print data for a duplex print job defines four pages 1210, each with unique content (e.g., "data 1," "data 2," etc.). In this example the print job includes PLEs that call out different types of print media for different ranges of pages. Specifically, a PLE indicates that each page 1210 of the print job will utilize the preprinted form indicated by entry 1220. Entry 1220 has PDL instructions for marking the word "FORM" at the top of a front side of a sheet, and for marking the word "FORM" at the bottom of a back side of the sheet. Controller 232 merges the PDL instructions for entry 1220 with the PDL print data of each page 1210 that is within the range of the PLE, such that PDL instructions for the front sides are merged with odd pages of the print job within the page range, and PDL instructions for the back sides are merged with even pages of the job within the page range. This process results in output 1230 for printing.

Figure 13:
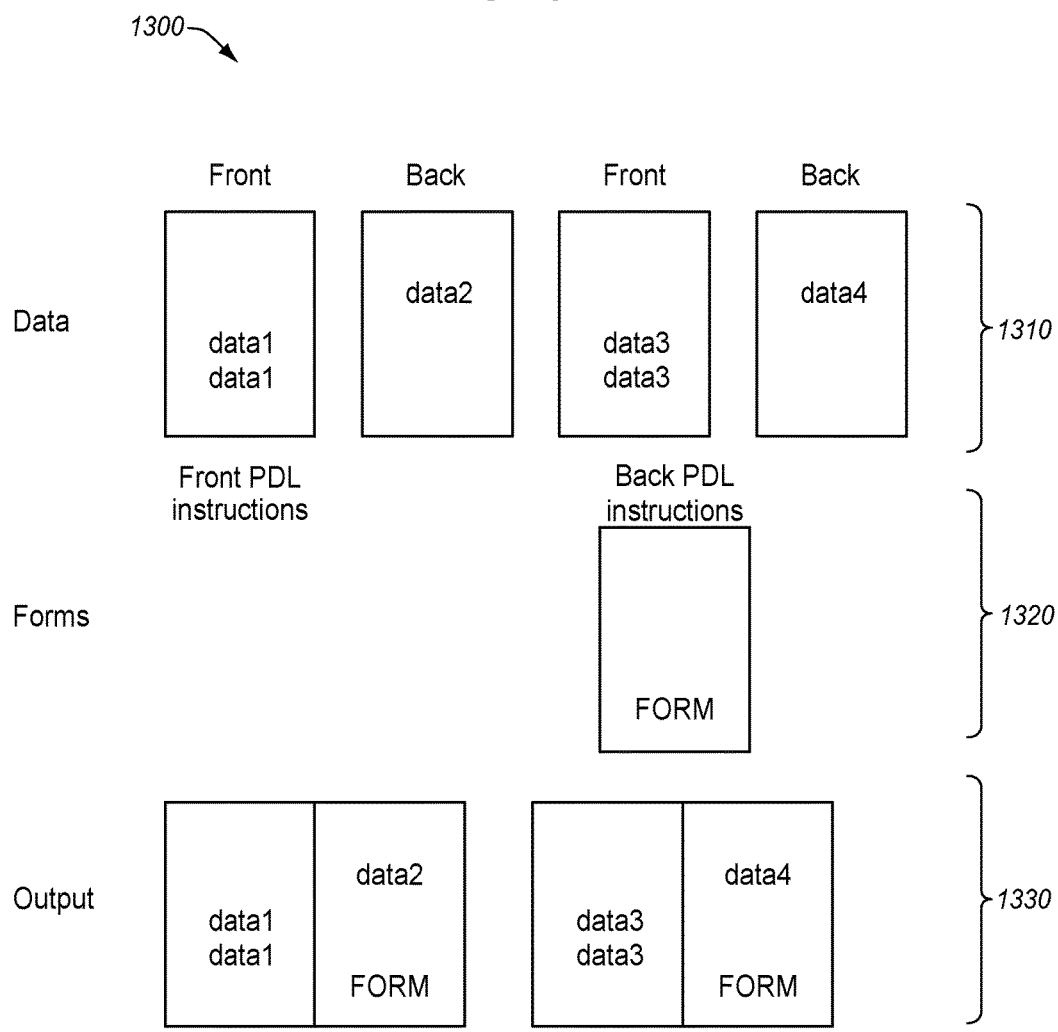

FIG. 13 provides an example 1300 where PDL print data for a duplex print job defines four pages 1310, each with unique content (e.g., "data 1," "data 2," etc.). The print job includes PLEs that call out different types of preprinted forms for certain ranges of pages. For example, a PLE indicates that the second through fourth of pages 1310 of the print job will utilize the same preprinted form indicated by entry 1220. Entry 1320 has PDL instructions for marking the word "FORM" at the bottom of a back side of a sheet. Controller 232 merges the PDL instructions for entry 1320 with the PDL print data of each page 1310 that is within the range of the PLE, such that PDL instructions for the back sides are merged with even pages of the job within the page range. In this example, the PLE refers to the second through fourth pages, so the PDL instructions at entry 1320 are integrated into the second and fourth pages of the print job. This is because only the second and fourth pages are within the page range and also back-side pages. This process results in output 1330 for printing.

In further embodiments, the various examples discussed above may be combined/mixed in any suitable fashion in order to ensure that other types of print jobs are merged with PDL instructions that allow for the replacement of preprinted forms with blank print media.

Figure 14:
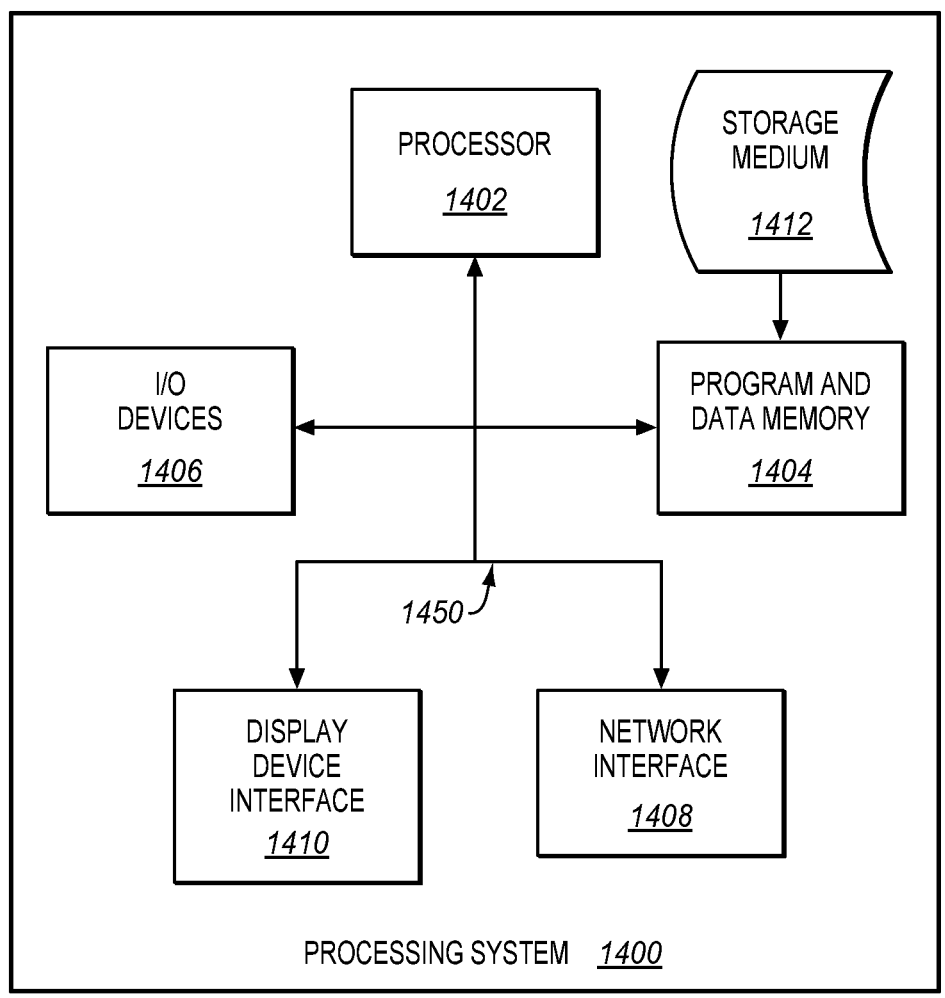
FIG. 14 illustrates a processing system operable to execute a computer readable medium embodying programmed instructions to perform desired functions in an illustrative embodiment.

Embodiments disclosed herein can take the form of hardware components implementing software or firmware, dedicated hardware, or various combinations thereof. In one particular embodiment, software is used to direct a processing system of print server 230 to perform the various operations disclosed herein. FIG. 14 illustrates a processing system 1400 operable to execute a computer readable medium embodying programmed instructions to perform desired functions in an illustrative embodiment. Processing system 1400 is operable to perform the above operations by executing programmed instructions tangibly embodied on computer readable storage medium 1412. In this regard, embodiments of the invention can take the form of a computer program accessible via computer-readable medium 1412 providing program code for use by a computer or any other instruction execution system. For the purposes of this description, computer readable storage medium 1412 can be anything that can contain or store the program for use by the computer.

Computer readable storage medium 1412 can be an electronic, magnetic, optical, electromagnetic, infrared, or semiconductor device. Examples of computer readable storage medium 1412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1400, being suitable for storing and/or executing the program code, includes at least one processor 1402 coupled to program and data memory 1404 through a system bus 1450. Program and data memory 1404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1406 (including but not limited to keyboards, displays, pointing devices, etc.) can be coupled either directly or through intervening I/O controllers. Network adapter interfaces 1408 may also be integrated with the system to enable processing system 1400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1410 may be integrated with the system to interface to one or more display devices, such as printing systems and screens for presentation of data generated by processor 1402.

Although specific embodiments were described herein, the scope of the invention is not limited to those specific embodiments. The scope of the invention is defined by the following claims and any equivalents thereof.

What is claimed is:

1. A system comprising:
a memory that is configured to store a number of entries which include Page Description Language (PDL) instructions for marking blank print media to match a number of types of preprinted forms;
an interface that is configured to receive a print job comprising PDL print data; and
a controller, coupled for communication with the memory and the interface, that is configured to determine that the print job includes a media callout referring to one of the types of preprinted forms, to consult an entry in the memory that corresponds with the type of preprinted form, to integrate PDL instructions from the entry into PDL print data for an existing page of the print job to match an appearance of the type of preprinted form at the existing page, to select a printer, and to transmit the print job to the printer for printing after the PDL instructions have been integrated,
wherein the controller is further configured to selectively determine whether to forego integrating PDL instructions, based on whether the printer is loaded with the type of preprinted form.

2. The system of claim 1 wherein:
the controller is configured to determine that the print job is designated for simplex printing, and to designate the print job for duplex printing in response to determining that the type of preprinted form includes marks on both a front side and a back side of a sheet.

3. The system of claim 2 wherein:
the controller is configured to interleave new back side pages with existing pages of the print job, and to insert PDL instructions from the entry into the new back side pages.

4. The system of claim 1 wherein:
the PDL is selected from the group consisting of Portable Document Format (PDF) and Advanced Function Presentation (AFP).

5. The system of claim 1 wherein:
the controller is configured to determine that the print job comprises a reprint of selected documents from a prior job printed by via continuous-forms printing, to determine the printer is a cut-sheet printer loaded with the type of preprinted form, and to forego integrating PDL instructions into the PDL print data.

6. The system of claim 1 wherein:
the controller is configured to replace media callouts in the print job for the type of preprinted form with media callouts for blank print media.

7. The system of claim 1 wherein:
the print job comprises a Portable Document Format (PDF) print job, and
the controller is configured to retrieve the media callout from a Job Definition Format (JDF) job ticket of the PDF print job.

8. The system of claim 1 wherein:
the print job comprises an Advanced Function Presentation (AFP) print job, and
controller is configured to retrieve the media callout from a medium map in a form definition (FORMDEF) resource of the AFP print job.

9. The system of claim 1 wherein:
each of the entries comprises:
PDL print data for a front side of a corresponding type of preprinted form, and an indication of whether the media callout shall be at least one of removed, altered, or kept.

10. A non-transitory computer readable medium embodying programmed instructions which, when executed by a processor, are operable for performing a method comprising:
receiving a print job comprising Page Description Language (PDL) print data;
determining that the print job includes a media callout referring to a type of preprinted form;
consulting an entry, stored in a memory, that corresponds with the type of preprinted form and includes PDL instructions for marking blank print media to match an appearance of the type of preprinted form;
selectively determining whether to forego integrating PDL instructions, based whether the printer is loaded with the type of preprinted form; and
integrating PDL instructions from the entry into PDL print data for an existing page of the print job to match the appearance of the type of preprinted form at the existing page.

11. The medium of claim 10 wherein the method further comprises:
determining that the print job is designated for simplex printing; and
designating the print job for duplex printing in response to determining that the type of preprinted form includes marks on both a front side and a back side of a sheet.

12. The medium of claim 11 wherein the method further comprises:
interleaving new back side pages with existing pages of the print job; and
inserting PDL instructions from the entry into the new back side pages.

13. The medium of claim 10 wherein the method further comprises:
selecting a printer; and
transmitting the print job to the printer for printing after the PDL instructions have been integrated.

14. The medium of claim 13 wherein the method further comprises:
the PDL is selected from the group consisting of Portable Document Format (PDF) and Advanced Function Presentation (AFP).

15. The medium of claim 13 wherein the method further comprises:
determining that the print job comprises a reprint of selected documents from a prior job; and
foregoing integrating PDL instructions into the PDL print data in response to determining that the print job is a reprint.

16. The medium of claim 10 wherein the method further comprises:
replacing media callouts in the print job for the type of preprinted form with media callouts for blank print media.

17. A non-transitory computer readable medium embodying programmed instructions which, when executed by a processor, are operable for performing a method comprising:
receiving a simplex print job that includes media callouts for at least one type of preprinted form that includes markings on a back side;
identifying Page Description Language (PDL) instructions for marking blank print media to match an appearance of the type of preprinted form;
selectively determining whether to forego integrating PDL instructions, based whether the printer is loaded with the type of preprinted form;
integrating the PDL instructions with pages of PDL print data at the print job; and
designating the simplex print job as a duplex print job.

* * * * *